US007250231B2

United States Patent
Edlund

(10) Patent No.: US 7,250,231 B2
(45) Date of Patent: Jul. 31, 2007

(54) AUXILIARY FUEL CELL SYSTEM

(75) Inventor: David J. Edlund, Bend, OR (US)

(73) Assignee: IdaTech, LLC, Bend, OR (US)

( * ) Notice: Subject to any disclaimer, the term of this patent is extended or adjusted under 35 U.S.C. 154(b) by 100 days.

(21) Appl. No.: 10/458,140

(22) Filed: Jun. 9, 2003

(65) Prior Publication Data

US 2004/0247961 A1    Dec. 9, 2004

(51) Int. Cl.
*H01M 8/04*    (2006.01)
(52) U.S. Cl. .............................. 429/23; 429/13; 429/22; 307/66
(58) Field of Classification Search .................. 429/23, 429/22, 13
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,857,735 A | 12/1974 | Louis et al. |
| 3,877,989 A | 4/1975 | Waldman et al. |
| 4,098,959 A | 7/1978 | Fanciullo |
| 4,098,960 A | 7/1978 | Gagnon |
| 4,214,969 A | 7/1980 | Lawrance |
| 4,349,613 A | 9/1982 | Winsel |
| 4,468,235 A | 8/1984 | Hill |
| 4,642,273 A | 2/1987 | Sasaki |
| 4,657,828 A | 4/1987 | Tajima |
| 4,820,594 A | 4/1989 | Sugita et al. |
| 4,904,548 A | 2/1990 | Tajima |
| 5,006,846 A | 4/1991 | Granville et al. |
| 5,200,278 A | 4/1993 | Watkins |

(Continued)

FOREIGN PATENT DOCUMENTS

EP        1065741 A2     1/2001

(Continued)

OTHER PUBLICATIONS

English-language abstract of German language PCT Patent Application Serial No. WO 97/43796, 1997, no month.

(Continued)

*Primary Examiner*—John S. Maples
(74) *Attorney, Agent, or Firm*—Kolisch Hartwell, P.C.

(57) ABSTRACT

Auxiliary fuel cell system that provides backup power to a primary power source, and energy-consuming systems that are otherwise associated with at least one primary power source and at least one auxiliary fuel cell system. The auxiliary fuel cell system includes at least one fuel cell stack that is adapted to produce an electric current from a fuel and an oxidant, such as from hydrogen and oxygen gases. The auxiliary fuel cell system further includes a source of fuel, such as a source of hydrogen gas, and this source may include a fuel processor that is adapted to produce the hydrogen gas or other fuel. The energy-consuming system is adapted to selectively draw an electric current from a primary power source or an auxiliary fuel cell system. A source selection system selectively establishes electrical communications between an energy-consuming system and the primary power source or the auxiliary fuel cell system.

18 Claims, 8 Drawing Sheets

U.S. PATENT DOCUMENTS

| | | | |
|---|---|---|---|
| 5,229,222 A | 7/1993 | Tsutsumi et al. | |
| 5,366,818 A | 11/1994 | Wilkinson et al. | |
| 5,366,821 A | 11/1994 | Merritt et al. | |
| 5,401,589 A | 3/1995 | Palmer et al. | |
| 5,432,710 A | 7/1995 | Ishimaru et al. | |
| 5,527,632 A | 6/1996 | Gardner | |
| 5,624,768 A | 4/1997 | Tanokura | |
| 5,637,414 A | 6/1997 | Inoue et al. | |
| 5,658,681 A | 8/1997 | Sato et al. | |
| 5,677,073 A | 10/1997 | Kawatsu | |
| 5,712,052 A | 1/1998 | Kawatsu | |
| 5,763,113 A | 6/1998 | Meltser et al. | |
| 5,771,476 A | 6/1998 | Mufford et al. | |
| 5,795,666 A | 8/1998 | Johnssen | |
| 5,798,186 A | 8/1998 | Fletcher et al. | |
| 5,861,137 A | 1/1999 | Edlund | |
| 5,897,766 A | 4/1999 | Kawatsu | |
| 5,897,970 A | 4/1999 | Isomura et al. | |
| 5,927,416 A | 7/1999 | del Re et al. | |
| 5,929,538 A | 7/1999 | O'Sullivan et al. | |
| 5,964,309 A | 10/1999 | Kimura et al. | |
| 5,985,474 A | 11/1999 | Chen et al. | |
| 5,989,739 A | 11/1999 | Zur Megede et al. | |
| 5,991,670 A | 11/1999 | Mufford et al. | |
| 5,997,594 A | 12/1999 | Edlund et al. | |
| 6,007,931 A | 12/1999 | Fuller et al. | |
| 6,011,324 A | 1/2000 | Kohlstruck et al. | |
| 6,067,482 A * | 5/2000 | Shapiro | 700/286 |
| 6,083,637 A | 7/2000 | Walz et al. | |
| 6,084,318 A * | 7/2000 | Mardirossian | 307/72 |
| 6,103,410 A | 8/2000 | Fuller et al. | |
| 6,165,633 A | 12/2000 | Negishi | |
| 6,183,914 B1 | 2/2001 | Yao et al. | |
| 6,214,484 B1 | 4/2001 | Hauer | |
| 6,221,117 B1 | 4/2001 | Edlund et al. | |
| 6,242,120 B1 | 6/2001 | Herron | |
| 6,376,113 B1 | 4/2002 | Edlund et al. | |
| 6,383,670 B1 | 5/2002 | Edlund et al. | |
| 6,387,556 B1 | 5/2002 | Fuglevand et al. | |
| 6,451,464 B1 | 9/2002 | Edlund et al. | |
| 6,465,118 B1 | 10/2002 | Dickman et al. | |
| 6,495,277 B1 | 12/2002 | Edlund et al. | |
| 6,522,955 B1 | 2/2003 | Colborn | |
| 6,569,227 B2 | 5/2003 | Edlund et al. | |
| 6,764,782 B2 | 7/2004 | Raiser et al. | |
| 6,764,785 B2 | 7/2004 | Colborn et al. | |
| 6,960,400 B2 * | 11/2005 | Hara et al. | 429/12 |
| 7,060,379 B2 | 6/2006 | Speranza et al. | |
| 2001/0049038 A1 * | 12/2001 | Dickman et al. | 429/19 |
| 2002/0114984 A1 | 8/2002 | Edlund et al. | |
| 2002/0169523 A1 | 11/2002 | Ross et al. | |
| 2002/0192516 A1 | 12/2002 | Tajima | |
| 2003/0072977 A1 * | 4/2003 | Speranza et al. | 429/9 |
| 2003/0176951 A1 | 9/2003 | DeMarchi et al. | |
| 2003/0215677 A1 | 11/2003 | Frost et al. | |
| 2004/0053082 A1 * | 3/2004 | McCluskey et al. | 429/9 |
| 2004/0229095 A1 * | 11/2004 | Pearson | 429/23 |

FOREIGN PATENT DOCUMENTS

| | | |
|---|---|---|
| JP | 4-163860 | 6/1992 |
| WO | WO 00/02282 | 1/2000 |

OTHER PUBLICATIONS

English-language abstract of Japanese Patent No. JP 4-163860, 1992, no month.

* cited by examiner

AUXILIARY FUEL CELL SYSTEM

FIELD OF THE DISCLOSURE

The present disclosure is directed generally to fuel cell systems, and more specifically to fuel cell systems that are adapted to provide backup, or auxiliary, power for a primary power source.

BACKGROUND OF THE DISCLOSURE

An electrochemical fuel cell is a device that converts fuel and oxidant to electricity, reaction product, and heat. Fuel cells commonly are configured to convert oxygen and a proton source, such as hydrogen, into water and electricity. In such fuel cells, the hydrogen is the fuel, the oxygen is the oxidant, and the water is the reaction product.

The amount of electricity produced by a single fuel cell may be supplemented by connecting two or more fuel cells together. A plurality of connected fuel cells is commonly referred to as a fuel cell stack. The fuel cells in a fuel cell stack are typically connected in series. Fuel cell stacks may be incorporated into a fuel cell system, which generally includes a source of hydrogen gas or other fuel for the fuel cell stack, and which typically also includes other components adapted to facilitate the conversion of fuel and oxidant into electricity.

SUMMARY OF THE DISCLOSURE

The present disclosure is directed to auxiliary fuel cell systems that provide backup power to a primary power source, and to energy-consuming systems that include or are otherwise associated with at least one primary power source and at least one auxiliary fuel cell system. The auxiliary fuel cell system includes at least one fuel cell stack that is adapted to produce an electric current from a fuel and an oxidant, such as from hydrogen and oxygen gases. The auxiliary fuel cell system further includes a source of fuel, such as a source of hydrogen gas, and this source may include a fuel processor that is adapted to produce the hydrogen gas or other fuel. The energy-consuming system is adapted to selectively draw an electric current from a primary power source or an auxiliary fuel cell system. A source selection system selectively establishes electrical communications between an energy-consuming system and the primary power source or the auxiliary fuel cell system.

DETAILED DESCRIPTION AND BEST MODE OF THE DISCLOSURE

Figure 1:
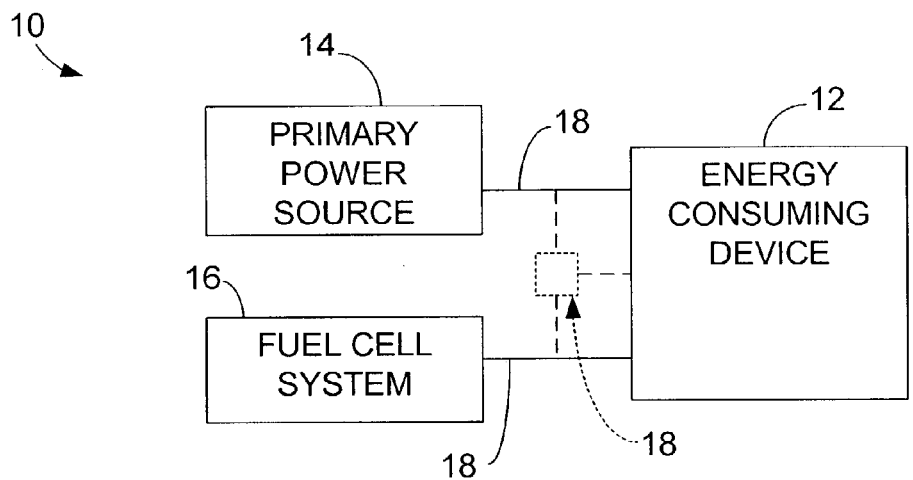
FIG. 1 is a schematic diagram of a power delivery network according to the present disclosure adapted to provide power to an energy-consuming system.

An illustrative example of a power delivery network that is configured to provide power to at least one energy-consuming system 12 is schematically illustrated in FIG. 1 and generally indicated at 10. Power delivery network 10 includes at least one primary power source 14 and at least one auxiliary fuel cell system 16. The primary power source and the auxiliary fuel cell system are electrically connected to the energy-consuming system 12 via power linkages 18, which as discussed in more detail herein schematically represent any suitable structure for selectively delivering power from systems 14 and 16 to the energy-consuming system 12. The primary power source and the auxiliary fuel cell system may be electrically interconnected with the energy-consuming system by the same power linkages, by separate power linkages, and/or by power linkages that share one or more common, or shared, components.

As is described in more detail herein, the auxiliary fuel cell system is configured to be used in tandem with the primary power source to provide highly reliable power to the energy-consuming system. In particular, auxiliary fuel cell system 16 is configured to selectively supply energy-consuming system 12 with auxiliary power when the primary power source is unable to supply power to the energy-consuming system. For the purposes of simplicity, the following discussion will refer to power delivery network 10 as including a single primary power source 14 and a single auxiliary fuel cell system 16; however, and as indicated above, it is within the scope of the disclosure that network 10 may include more than one of any of these components.

As used herein, energy-consuming system 12 generally represents any electrical device or plurality of electrical devices that are configured to be powered by the power delivery network. The energy-consuming system therefore applies an electrical load to the power delivery network, with the device(s) thereby being powered by the primary power source or the auxiliary fuel cell system. For example, energy-consuming system 12 may include any combination of one or more residences, commercial buildings, neighborhoods, tools, lights, appliances, computers, industrial equipment, stationary devices, signaling devices, communication devices, etc.

Primary power source 14 may include a public or private utility grid, a wind-powered energy source, solar-powered energy source, water-powered energy source, nuclear-powered energy source, or virtually any other type of energy source configured to output electric power. The primary power source has a plurality of operating states relative to the energy-consuming system. These operating states include at least a power delivery operating state and an interrupted operating state. When the primary power source is currently configured, or ready, to deliver power, it is said to be in a power delivery operating state. By this it is meant that the primary power source is ready, or primed, to have an electric current drawn therefrom responsive at least in part to an applied load, such as a load applied by energy-consuming system 12. Accordingly, when the primary power source is in its power delivery operating state, the primary power source is configured and ready to provide power to satisfy an applied load from the energy-consuming system.

On the other hand, when the primary power source is currently unable to deliver power to the energy-consuming system, or currently unable to produce an electric current to satisfy an applied load from the energy-consuming system, the primary power source is said to be in an interrupted operating state. Therefore, if the primary power source is for whatever reason not presently able to produce, or to produce sufficient, power to satisfy the applied load from the energy-consuming system, then the primary power source is in an interrupted operating state because it is not currently configured to provide power to the energy-consuming system. As used herein, the primary power source may also be described as being in an interrupted operating state when the electrical connection between the primary power source and the energy-consuming system is disconnected or otherwise impaired so that power produced by the primary power source is prevented from being delivered to the energy-consuming system. Accordingly, the primary power source may be in an interrupted operating state even if the primary power source has not malfunctioned or even if the primary power source is producing an electric current, if that current is not delivered to the energy-consuming system.

Depending on the particular form of the primary power source, power may be interrupted or unavailable relative to the energy-consuming system due to a variety of events or occurrences, such as equipment failure, intentional shutdown or isolation of the primary power source (such as for maintenance, repair or servicing), disconnection or interruption in the power linkage between the primary power source and the energy-consuming system, blackout, brownout, lack of wind, lack of sun, lack of water current, etc. An interruption in power can adversely affect the energy-consuming system and/or otherwise cause an inconvenience, such as by rendering the energy-consuming system unpowered by the power delivery network.

As is described in more detail below, auxiliary fuel cell system 16 is configured to automatically deliver auxiliary power to energy-consuming system 12 when primary power source 14 is in an interrupted operating state and/or responsive to the detection that the primary power source is in an interrupted operating state. Therefore, the auxiliary fuel cell system limits, or even eliminates, downtime of the energy-consuming system. By "downtime," it is meant the period of time in which the energy-consuming system is applying a load to (i.e., attempting to draw power from) the primary power source or the auxiliary fuel cell system without any power being provided thereto. When the primary power source returns to a power delivery operating state, the auxiliary fuel cell system is configured to selectively cease delivering power to the energy-consuming system. In this manner, the auxiliary fuel cell system serves as a backup to the primary power source, providing power to the energy-consuming system when the primary power source is in an interrupted operating state.

Figure 2:
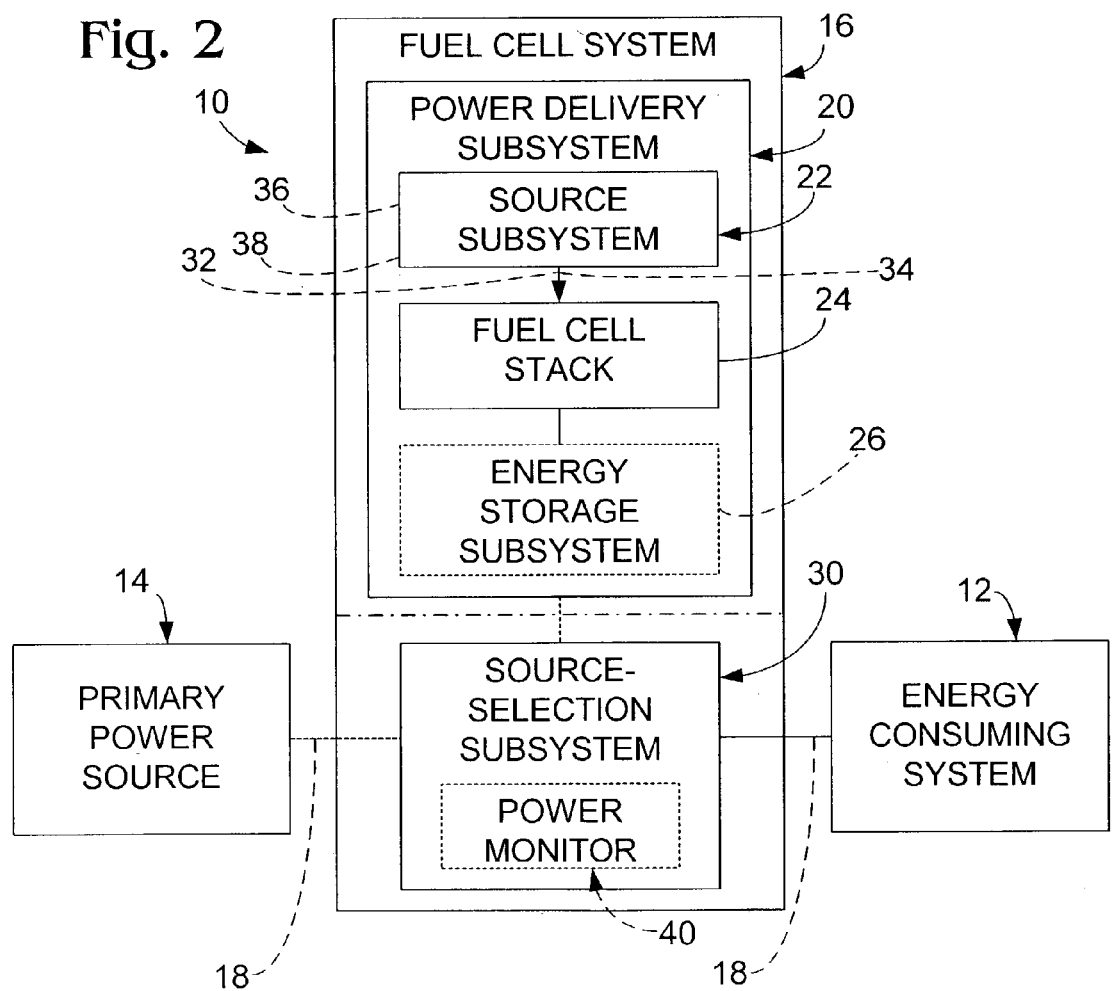
FIG. 2 is a schematic diagram of another power delivery network according to the present disclosure adapted to provide power to an energy-consuming system.

As shown in FIG. 2, auxiliary fuel cell system 16 includes a power delivery subsystem 20, which in turn includes source subsystem 22 and at least one fuel cell stack 24. The power delivery subsystem may also (but is not required to) include an energy storage subsystem 26. Source subsystem 22 is configured to provide fuel cell stack 24 with fuel and oxidant. Subsystem 22 may also be described as being adapted to provide streams of fuel and oxidant to the fuel cell stack. The delivery of fuel and oxidant to fuel cell stack is schematically illustrated in FIG. 2, with reference numeral 32 representing at least one fuel stream and reference numeral 34 representing at least one oxidant stream. A non-exclusive example of a suitable fuel is hydrogen gas, and a non-exclusive example of a suitable oxidant is oxygen gas, which may be delivered in such illustrative forms as an air stream, as an oxygen stream, or as an oxygen-enriched air stream. The source subsystem includes suitable sources for each of the fuel and the oxidant, with suitable sources including at least one storage device, or vessel, 36 for the fuel or oxidant and/or at least one device 38 that is configured to produce by chemical reaction or otherwise the fuel and/or the oxidant.

To further illustrate this point, in the context of a fuel in the form of hydrogen gas, illustrative examples of suitable storage devices 36 include pressurized tanks, hydride beds, and other devices that are adapted to store a volume of hydrogen gas. Illustrative examples of suitable storage devices 36 for oxygen gas include pressurized tanks and other devices that are adapted to store a volume of oxygen gas. Illustrative examples of suitable devices 38 that are adapted to produce hydrogen gas from one or more reactants, or feed stocks, include fuel processors, such as steam reformers, autothermal reformers, partial oxidation reactors, pyrolysis reactors, and electrolyzers. Illustrative examples of suitable devices 38 that are adapted to produce streams of oxygen gas or oxygen-enriched air include pressure swing adsorption systems and oxygen-selective membrane modules that are adapted to receive an air stream and partially, or complexly, separate the oxygen gas from the other components of the air stream. Because of its availability in the environment, air may be obtained from the environment and delivered to the fuel cell stack by a suitable fan, compressor, blower or the like. Continuing these examples, any of these sources may include or otherwise be associated with a purification device that is adapted to remove contaminants from the fuel stream that is produced or otherwise received from the source.

Fuel cell stack 24 is adapted to receive the fuel and oxidant and to produce an electric current therefrom. The electric current may be used to satisfy the energy requirements of the auxiliary fuel cell system (balance of plant requirements), provide power to an external system, such as energy-consuming system 12, and/or produce an electric current that is stored for later use, such as by the subsequently described energy storage subsystem 26. In particular, the electric current produced by the fuel cell stack may be supplied to, or drawn from, energy-consuming system 12 to satisfy an applied load therefrom in response to primary power source 14 entering an interrupted operating state. Stack 24 may include any suitable type of fuel cell stack, with illustrative examples including proton exchange membrane (PEM) fuel cells, alkaline fuel cells, molten carbonate fuel cells, and phosphoric acid fuel cells.

Fuel cell stack 24 may be selectively configured between a plurality of operating states. These operating states include at least a shutdown operating state, in which the fuel cell stack is not receiving fuel and/or oxidant streams and is not preheated or otherwise primed to produce an electric current immediately upon receipt of fuel and oxidant streams, and a current-producing operating state, in which the fuel cell stack is receiving fuel and oxidant streams and producing an electric current therefrom. It is within the scope of the disclosure that fuel cell stack 24 may be selectively configured between additional defined operating states, including a start up operating state, in which the fuel cell stack is preheated to a temperature at which it is configured to produce an electric current upon receipt of fuel and oxidant streams, and an idle operating state, in which the fuel cell stack is primed, or ready, to produce an electric current upon receipt of fuel and oxidant streams, but in which the fuel cell stack is either not receiving these streams or only receiving sufficient amounts of these streams to maintain the fuel cell stack in this primed operating state.

As schematically illustrated in FIG. 2, auxiliary fuel cell system 16 may, but is not required to, include an energy storage subsystem 26. Energy storage subsystem 26 includes any suitable structure that is adapted to store electric current for later use. By this it is meant that the energy storage subsystem is adapted to receive an electric current and produce a potential therefrom that can be used in the future to satisfy an applied load. For example, when present, the energy storage subsystem may include one or more batteries, ultra-capacitors, flywheels, and/or similar devices that are designed to store energy and selectively output an electric current responsive to an applied load. Energy storage subsystem 26 may be used to satisfy the energy requirements of the auxiliary fuel cell system and/or to provide auxiliary power to the energy-consuming system. It is within the scope of the present disclosure that the applied load may be applied to the fuel cell stack, to the energy storage subsystem, or both.

As an illustrative example of the above during a loss of primary power from the primary power source, the energy storage subsystem may be used to satisfy the energy requirements of energy-consuming system 12 while the fuel cell stack is preparing to produce additional power. Continuing the above example, the fuel cell stack may not be able, upon the detection of the primary power source being in an interrupted operating state, to produce any, or sufficient, electric current to satisfy the load applied by the energy-consuming system. For example, the fuel cell stack may not be in a current-producing operating state, the source subsystem may not be currently adapted to produce and/or deliver fuel to the fuel cell stack, etc. By utilizing an energy storage subsystem, the auxiliary fuel cell system can respond immediately to the applied load to be satisfied by the auxiliary fuel cell system, regardless of whether the fuel cell stack is producing, or currently configured to produce, an electric current at the time the interrupted operating state of the primary power source is detected.

It should be understood that energy storage subsystem 26 has a finite energy storage capacity, which may be exhausted if not recharged. It should be further understood that the particular capacity of energy storage subsystem 26 may vary depending upon a variety of factors, including user preferences, the particular auxiliary fuel cell system that the storage subsystem is designed to service, the particular energy-consuming system to be selectively powered by the energy storage subsystem, the rated, or expected, load to be applied by the energy-consuming system, the desired time period for which the energy storage subsystem is able to satisfy a selected applied load, the cost and desired size of the energy-storage subsystem, etc. Energy storage subsystem 26 is preferably configured to be (re)charged by fuel cell stack 24, via any suitable mechanism, and may additionally or alternatively be adapted to convert current from primary power source 14 into stored auxiliary power. For example, to facilitate charging, the fuel cell stack and the energy storage subsystem may be electrically coupled in parallel on the same bus. Similarly, the energy-storage subsystem may utilize a suitable charger, or charging device, to establish the stored potential from the electric current. It is within the scope of the present disclosure that the energy storage subsystem may be physically integrated with other portions of the auxiliary fuel cell system, or the energy storage subsystem may be an external peripheral system configured to operatively couple with another portion of the auxiliary fuel cell system via a suitable power linkage.

The power delivery network, and preferably auxiliary fuel cell system 16, also includes a source-selection subsystem 30 that is configured to control power delivery to the energy-consuming system. Subsystem 30 may additionally or alternatively be described as selectively enabling and/or disabling electrical communication, or power linkages, between the energy-consuming system and the auxiliary fuel cell system or the primary power source to selectively regulate which of the auxiliary fuel cell system and the primary power source is currently configured to provide power to satisfy an applied load from the energy-consuming system. The source-selection subsystem may further include one or more power management modules that are adapted to condition the power provided to the energy-consuming system. This conditioning may include regulating the voltage, increasing (boosting) or decreasing (bucking) the voltage, converting the current (such as to an AC current), etc. Auxiliary fuel cell system 16 may also include additional and/or alternative elements, such as those described with reference to fuel cell systems designed without a source-selection subsystem 30 in U.S. Pat. Nos. 6,403,249, 6,242,120, 6,083,637, 5,879,826, 5,637,414, 5,432,710, 5,401,589 and 4,098,959, and in U.S. patent application Ser. Nos. 09/477,128 and 10/153,282, the complete disclosures of which are hereby incorporated by reference for all purposes. In FIG. 2 the source-selection subsystem is schematically illustrated as being part of auxiliary fuel cell system 16. It is within the scope of the present disclosure that the source-selection subsystem may be otherwise positioned and/or integrated within the power delivery network, such as being part of the primary power source, having one or more components that are part of the primary power source and/or the auxiliary fuel cell system, and being a stand-alone unit that is in communication with the primary power source and the auxiliary fuel cell system. This is schematically depicted with a dash-dot line in FIG. 2 for the purpose of graphically depicting this range of illustrative options.

Components of the auxiliary fuel cell system are herein described as functional units for the purpose of clarity (i.e. power delivery subsystem, source subsystem, source-selection subsystem, etc.). It is within the scope of the disclosure that in some embodiments, two or more functional units may include shared componentry, and may even be partially or completely integrated with one another. For example, power delivery subsystem 20 and source-selection subsystem 30 may share a common processor configured to execute instructions to respectively facilitate power delivery and source-selection functions. It is also within the scope of the disclosure that one or more of the functional units may be integrated with or otherwise associated with other components of the power delivery network, and/or that one or more of the functional units may be a stand alone unit that is in communication with the other components described herein.

As discussed, the power delivery network, and preferably the auxiliary fuel cell system thereof, includes a source-selection subsystem 30 that is adapted to control the delivery of power from the power delivery network to energy-consuming system 12. In the following discussion, the source-selection subsystem is described as a component of the auxiliary fuel cell system, however, it is within the scope of the disclosure that the source-selection subsystem may be otherwise implemented within or associated with the power delivery network to selectively control the source of power for the energy-consuming system. Source-selection subsystem 30 is configured to direct power delivery based on the operating state of at least one of the primary power source, the energy-consuming system, and the power delivery subsystem. In general, the source-selection subsystem is configured to limit, or even eliminate, any potential interruption of power to the energy-consuming system. Therefore, when an interrupted operating state of the primary power source is detected, the source-selection subsystem is configured to utilize the auxiliary fuel cell system to provide auxiliary power to the energy-consuming system at least until the primary power source returns to a power delivery operating state. To this end, the source-selection subsystem is configured to operatively "switch" between the primary power source and the power delivery subsystem of the auxiliary fuel cell system in order to supply power to energy-consuming system 12.

Figure 3:
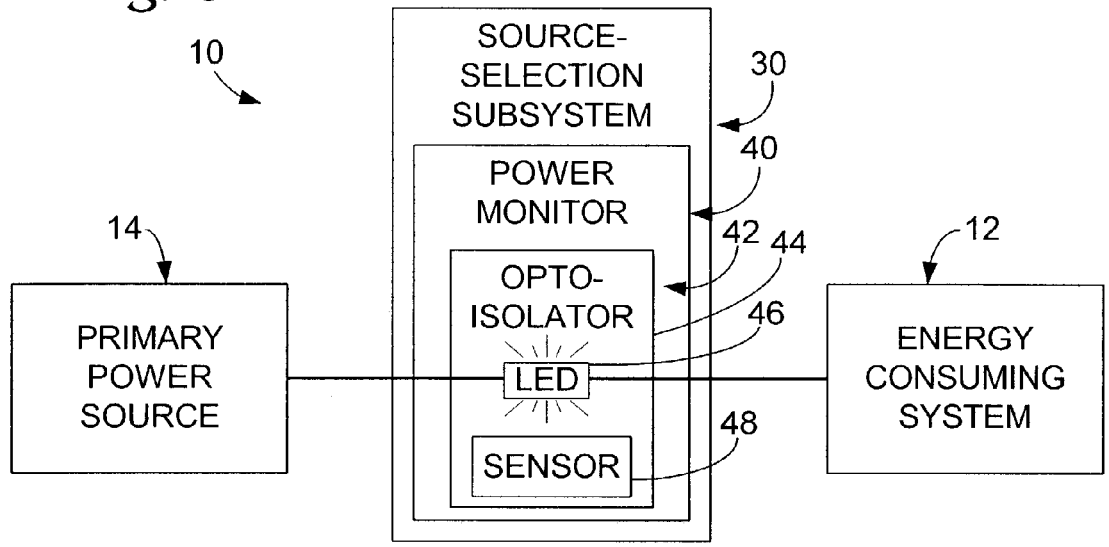
FIG. 3 is a schematic diagram of an illustrative power monitor for use with auxiliary fuel cell systems according to the present disclosure.

As indicated in dashed lines in FIG. 2, the source-selection subsystem may include a power monitor 40 that is adapted to detect the operating state of the primary power source. For example, the power monitor may be adapted to determine or otherwise detect if primary power source 14 is in a power delivery operating state, an interrupted operating state and/or one or more operating states other than the power delivery and interrupted operating states. Power monitor 40 may utilize any suitable detection structure and/or method to detect the operating state of the primary power source. Accordingly, power monitor 40 may be described as including a detection assembly 42 that is adapted to determine the operating state of the primary power source. An illustrative, non-exclusive example of a suitable configuration for detection assembly 42 is schematically illustrated in FIG. 3. As shown, power monitor 40 includes an opto-isolator 44. Opto-isolator 44 includes a light emitting diode (LED) 46 and a complementary sensor 48 that is configured to monitor the LED. The LED is operatively coupled to the primary power source and is configured to emit light when the primary power source is in a power delivery operating state. When the primary power source is not in a power delivery operating state, the LED is configured to cease emitting light, change color or intensity, or otherwise provide a visible or detectable signal. Accordingly, sensor 48 is configured to detect this signal. For example, the LED may be powered by the primary power source, with the operating state of the primary power source indicated by the state of the LED, which is monitored by sensor 48. In such a configuration, the loss of power delivery to the LED from the primary power source will cause the LED to no longer be illuminated, with this change being detected by sensor 48. Therefore, opto-isolator 44 may be used to detect when the primary power source is in an interrupted operating state, is in a power producing operating state, and/or when the primary power source changes between these operating states.

Figure 4:
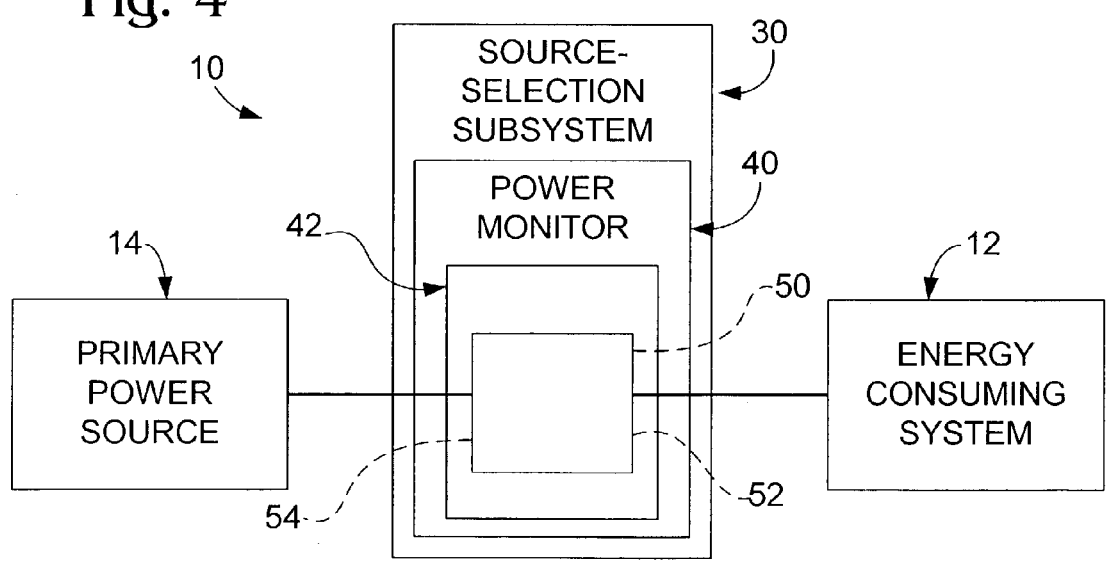
FIG. 4 is a schematic diagram of other illustrative power monitors for use with auxiliary fuel cell systems according to the present disclosure.

An opto-isolator, and the illustrative configuration described above, are provided as an illustrative example of a suitable detection assembly for power monitor 40. It is within the scope of the disclosure for power monitor 40 to include any other suitable detection assembly and/or other structure for selectively determining the operating state of the primary power source relative to the energy-consuming system. As another example, and as schematically illustrated in dashed lines in FIG. 4, the power monitor may include a detection assembly 50 that is configured to monitor the waveform of electric current delivered from the primary power source to determine if the waveform corresponds to a power delivery operating state. As yet another example, which is also schematically illustrated in dashed lines in FIG. 4, the source-selection subsystem may include a power monitor with a detection assembly 52 that includes a relay that is energized by the primary power source. If the primary power source enters an interrupted operating state, the relay opens and the source-selection subsystem identifies the open relay as corresponding to a loss of delivered power from the primary power source. In such a configuration, a return by the primary power source to its power delivery operating state may also be detected by the relay closing when the delivery of power thereto is resumed. As still another example, the power monitor may include a detection assembly 54 with a sensor that is adapted to monitor the voltage of the power from the primary power source, such as to determine if the voltage (normalized, conditioned, or raw) falls within predetermined parameters, exceeds a predetermined minimum value, exceeds a predetermined maximum value, etc. Continuing the above example, and for the purpose of further illustration, the voltage of the output may be measured either before or after being conditioned and compared to a standard, or expected, voltage or voltage range.

When desirable, the current from the primary power source may first be rectified or otherwise conditioned before the power monitor measures the voltage. The power monitor may also include filters and/or controller logic to distinguish between an interrupted operating state and an a momentary loss or reduction in power or other anomaly that may otherwise incorrectly appear to correspond to a loss of delivered power from the primary power source.

Figure 5:
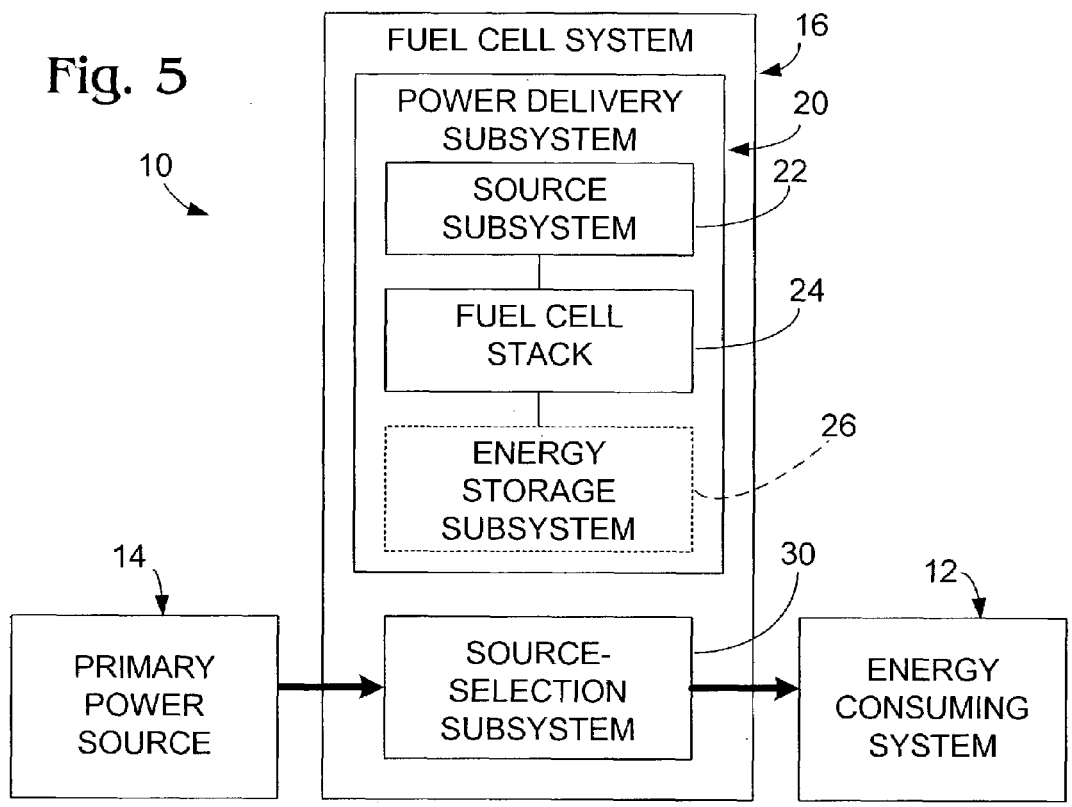
FIG. 5 is a schematic diagram of the power delivery network of FIG. 2 with the primary power source in a power-delivery operating state relative to the energy-consuming system.
Figure 6:
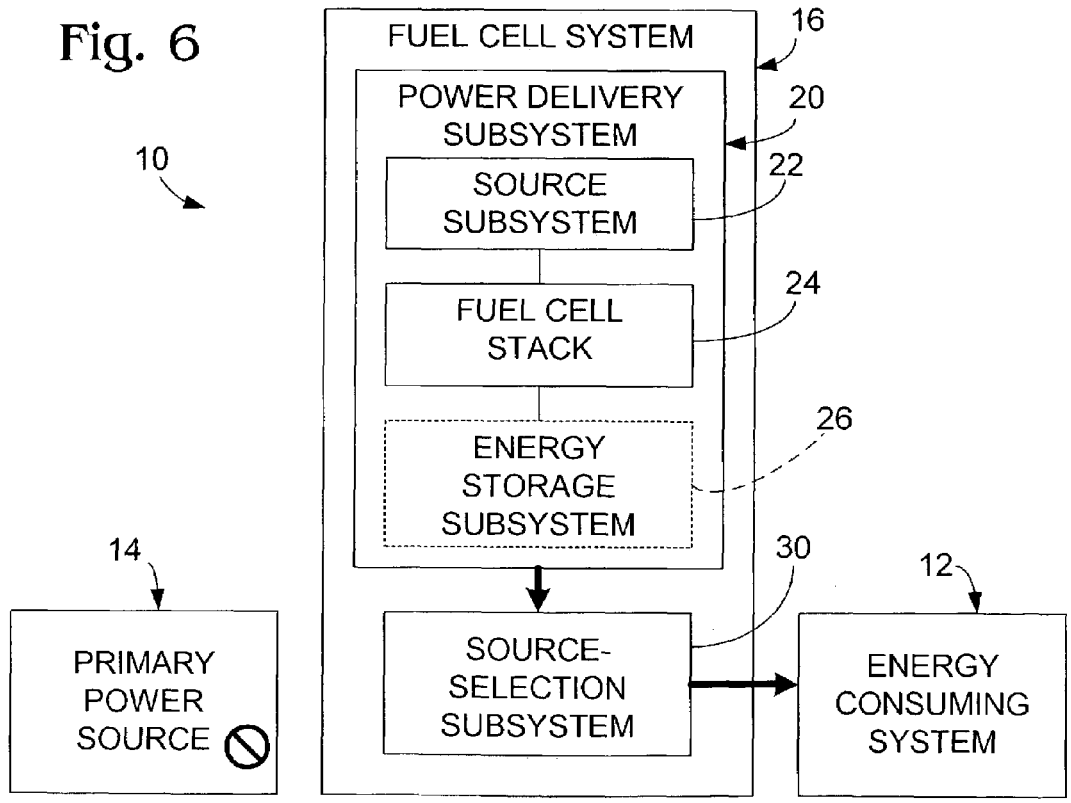
FIG. 6 is a schematic diagram of the power delivery network of FIG. 2 with the primary power source in an interrupted operating state relative to the energy-consuming system.

As described below, the determined operating state of the primary power source relative to the energy-consuming system is used to determine the source of power to which the energy-consuming system's load is applied. When the primary power source is in an energy-producing operating state relative the energy-consuming system, as schematically illustrated in FIG. 5, the energy-consuming system is powered by the primary power source. When the primary power source is in an interrupted operating state relative to the energy-consuming system, as schematically illustrated in FIG. 6, the energy-consuming system is powered by the auxiliary fuel cell system. Source-selection subsystem 30 is configured to control the selected one of primary power source 14 and auxiliary fuel cell system 16 to which the load from the energy-consuming system is applied responsive at least in part to the determined operating state of the primary power source. In this manner, the auxiliary fuel cell system backs up the primary power source until the primary power source returns to a power delivery operating state relative to the energy-consuming system. The primary power source and the auxiliary fuel cell system cooperate to limit or eliminate time in which the power delivery network is unable to satisfy an applied load from the energy-consuming system.

Figure 7:
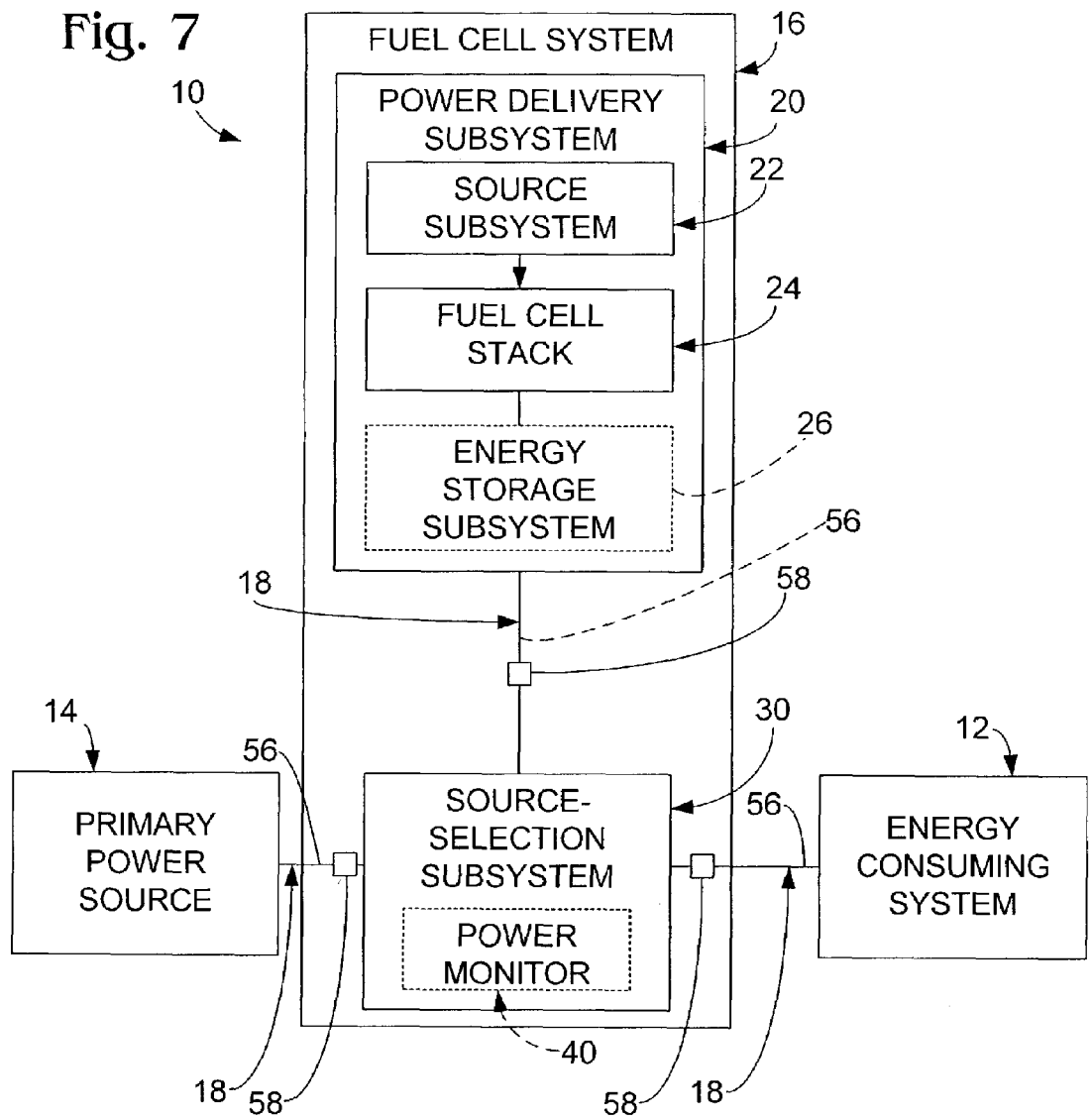
FIG. 7 is a schematic diagram of the power delivery network of FIG. 2 showing illustrative components of the power linkages between the energy-consuming system and the primary power source and the power delivery subsystem of the auxiliary fuel cell system.

To control power delivery to the energy-consuming system, source-selection subsystem 30 is configured to operatively connect and disconnect primary power source 14 and/or power delivery subsystem 20 from energy-consuming system 12. When power is to be delivered from primary power source 14, the source-selection subsystem establishes, or enables, a power linkage between the primary power source and the energy-consuming system. As used herein, "power linkage" may include any suitable device(s) or structure(s) for conducting electric current, such as one or more lengths of conductor, and optionally one or more circuit elements, such as breakers, switches, conditioners, converters, diodes, measuring instruments, etc. This is schematically illustrated in FIG. 7, in which power linkages 18 are shown including lengths of conductor 56 and at least one circuit element 58. In general, a power linkage is configured to provide a charge path through which electric current may flow, and the power linkage may include various elements to assist in current flow or other functions. The establishment of a power linkage may also be described as enabling an electrical connection.

When the primary power source is available to satisfy the applied load from the energy-consuming system, the source-selection subsystem establishes an operational power linkage between the primary power source and the energy-consuming system, while disabling or otherwise rendering selectively inoperational the power linkage between the power delivery subsystem and the energy-consuming device. This is schematically illustrated in the previously discussed FIG. 5. Similarly, when the primary power source is for whatever reason not available to satisfy the applied load from the energy-consuming system the source-selection subsystem establishes an operational power linkage between the power delivery subsystem and the energy-consuming system and selectively renders the power linkage between the primary power source and the energy-consuming system inoperational, such as schematically illustrated in FIG. 6. Therefore, regardless of the physical positioning of these elements, the source-selection subsystem is adapted to regulate the electrical connection between the energy-consuming system and a selected one of the primary power source and the auxiliary fuel cell system, or more particularly, the power delivery subsystem thereof. The timing of the enabling and disabling may vary within the scope of the disclosure. For example, the steps may occur concurrently, or simultaneously, or one step may be performed before the other.

Figure 8:
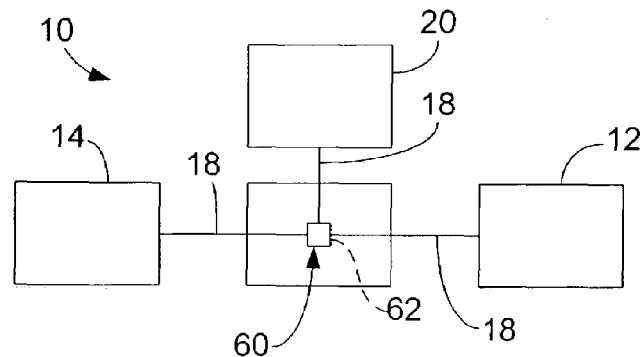
FIG. 8 is a schematic diagram of another illustrative source-selection subsystem for power delivery networks according to the present disclosure.

The source-selection subsystem is optionally configured to limit back-feed of current from the primary power source to the power delivery subsystem, and/or vice versa. As a more particular example, the source selection subsystem may be configured to selectively interrupt or disable a power linkage between the primary power source and the power delivery subsystem. For example, the source-selection subsystem may be configured to electrically disconnect the power delivery subsystem from the primary power source when the primary power source is in a power delivery operating state. As used herein, "disconnect" means to block a charge path, and not necessarily to completely eliminate any physical connection. The source-selection subsystem may include any suitable back-feed prevention structure, such as schematically illustrated in FIG. 8 at 60. Illustrative, non-exclusive examples include circuitry configured to prevent back-feed, circuit breakers, diodes, and the like.

As an illustrative example of a suitable configuration for such a back-feed prevention structure for the source-selection subsystem, structure 60 may be configured to implement a break-then-make connection to prevent back-feed between the primary power source and the power delivery subsystem. In a break-then-make connection, primary power source 14 is operatively disconnected from energy-consuming system 12 and power delivery subsystem 20 before the power delivery subsystem is operatively connected to the energy-consuming system. By "operatively connected," it is meant that the power delivery subsystem is configured to deliver an electric current to satisfy an applied load. To this effect, a power linkage between the primary power source and the power delivery subsystem of the auxiliary fuel cell system is avoided. Therefore, back-feed between the primary power source and the power delivery subsystem of the auxiliary fuel cell system is prevented.

As an illustrative, non-exclusive example of a suitable structure for implementing a break-then-make connection, the source-selection subsystem may include back-feed prevention structure 60 that includes a switching mechanism 62 that is communicatively coupled to the power monitor. Mechanism 62 is configured to establish the desired power linkage in response to the operating state of the primary power source. When configured for a break-then-make connection, the source-selection subsystem is generally configured to execute the connection within a predetermined switching time that is short enough for a desired application. For example, the source-selection subsystem may be configured to operatively disconnect primary power source 14 and operatively connect power delivery subsystem 20 within such a predetermined switching time. Depending on the intended application of the auxiliary fuel cell system, the source-selection subsystem may be configured to execute a long switch of 1-5 seconds, a medium switch of 0.1-0.99 seconds, a short switch of 0.001 seconds to 0.099 seconds, or an ultrashort switch of less than 0.001 seconds. Shorter switch times facilitate reduced interruption in power delivery to the energy-consuming system, because auxiliary power delivery may begin after the break-then-make connection is executed.

Source-selection subsystem 30 may be configured to directly or indirectly transition the auxiliary fuel cell system to a current-producing operating state upon detection that the primary power source is in an interrupted operating state. By this it is meant that the source-selection subsystem may be selectively configured to start up the fuel cell stack 24 (and/or any fuel processor of the source subsystem), so that the fuel cell stack may provide sustainable auxiliary power to the energy-consuming system when it has sufficiently warmed up. Alternatively, the source subsystem may be in communication with any suitable controller or processor of the auxiliary fuel cell system or power delivery network, with this controller or processor directing the transition of the auxiliary fuel cell system to a current-producing operating state responsive to detection by the source-selection subsystem that the primary power source is in an interrupted operating state. As a further variation, the auxiliary fuel cell system and/or power delivery network may include an independent sensor or other detection structure that is adapted to detect when the primary power source is in an interrupted operating state and to direct the transition of the auxiliary fuel cell system to a current-producing operating state responsive at least in part to this detection.

Auxiliary fuel cell systems 16 according to the present disclosure may be configured to provide a variety of types of backup power for a primary power source. For example, auxiliary fuel cell systems 16 may be configured to provide power to satisfy an applied load from the energy-consuming system within a predetermined time period after detection that the primary power source is in an interrupted operating state relative to the energy-consuming system. As described herein, auxiliary fuel cell systems may be configured to provide interrupted backup power or uninterrupted backup power. Systems that provide interrupted backup power may allow a noticeable gap between the time a primary power source enters an interrupted operating state and the time a power delivery subsystem begins to deliver auxiliary power. On the other hand, systems that provide uninterrupted backup power are configured to immediately transition power delivery from the primary power source to the auxiliary fuel cell system upon detection that the primary power source is in an interrupted operating state. Therefore, an energy-consuming system receives a constant, or near constant, source of power. Described in other terms, an interrupted power supply may be described as resulting in an interruption in the operation of the energy-consuming system responsive to the interruption in the supply of power from the primary power source. Similarly, an uninterrupted power supply may be described as preventing interruption in the operation of the energy-consuming system responsive to the interruption in the supply of power from the primary power source.

From a functionality standpoint, it may be desirable to have an auxiliary fuel cell system that is configured to provide uninterrupted backup power. Uninterrupted backup power may be particularly desirable for such energy-consuming devices as computer networks, medical devices or facilities, continuous monitoring or measuring devices, cash registers and other electronic devices to facilitate commerce, communications equipment, and other equipment and devices in which it is necessary to have a reliable, uninterrupted power supply so that operation of the equipment/devices is not interrupted (such as electronic equipment incorporating microprocessors). An auxiliary fuel cell system that is adapted to provide uninterrupted backup power will typically include an energy storage subsystem that is adapted (configured and sized with sufficient capacity) to supply power to satisfy the applied load from the energy consuming system at least until the auxiliary fuel cell system has sufficient time to transition to a current-producing operating state. In this manner, the energy storage subsystem is configured to provide fast-acting short-term backup power, while the fuel cell stack is configured to provide sustainable long-term backup power. The fuel cell stack may be (but is not required to be) configured to recharge the energy storage subsystem after the fuel cell stack is in a current-producing operating state. Collectively, the energy storage subsystem and the fuel cell stack are configured to supply power to the energy-consuming device whenever the primary power source is unable to supply power.

The time period for the auxiliary fuel cell system to transition to a current-producing operating state may vary depending upon such factors as the construction and present operating state of the auxiliary fuel cell system. For example, it will take more time to transition to the current-producing operating state from a shutdown operating state than from an idle operating state. Similarly, the source subsystem of the auxiliary fuel cell system may impact the time required to transition to a current-producing operating state. For example, if the source subsystem relies upon a fuel processor to generate at least one of the fuel or oxidant streams for the fuel cell stack, the time required to produce this stream or streams needs to be considered. On the other hand, an auxiliary fuel cell system with a source subsystem that utilizes storage devices and therefore is configured to supply the fuel cell stack with the required fuel and oxidant streams without needing to start up a fuel processor may be able to transition the auxiliary fuel cell system to a current-producing operating state sooner than a system that requires a fuel processor to be started up to make this transition.

In some applications, it may be acceptable to utilize an auxiliary fuel cell system that provides backup power, but only interrupted backup power. By this it is meant that there is a noticeable delay between the detection that the primary power source is not available to provide power to satisfy the applied load of the energy consuming system and the provision of backup power by the auxiliary fuel cell system. As described above, an interrupted power supply typically results in a situation where there is an applied load from the energy consuming system that is not able to be satisfied for a time period after detection that the primary power source is in an interrupted operating state. Examples of situations where it may be acceptable to have an interrupted backup power supply include situations where a power outage is acceptable so long as the power outage has at most a determined duration, with the auxiliary fuel cell system being configured to transition to a current-producing operating state in a time period that is shorter than this determined duration. Depending on the particular design of the auxiliary fuel cell system, the auxiliary fuel cell system may supply auxiliary power (upon detection of the primary power source being in an interrupted operating state) within such illustrative time periods as 1 hour, 30 minutes, 15 minutes, 5 minutes, or less. It is within the scope of the present disclosure that longer or shorter time periods may be utilized, as the above are merely provided as illustrative examples.

Figure 9:
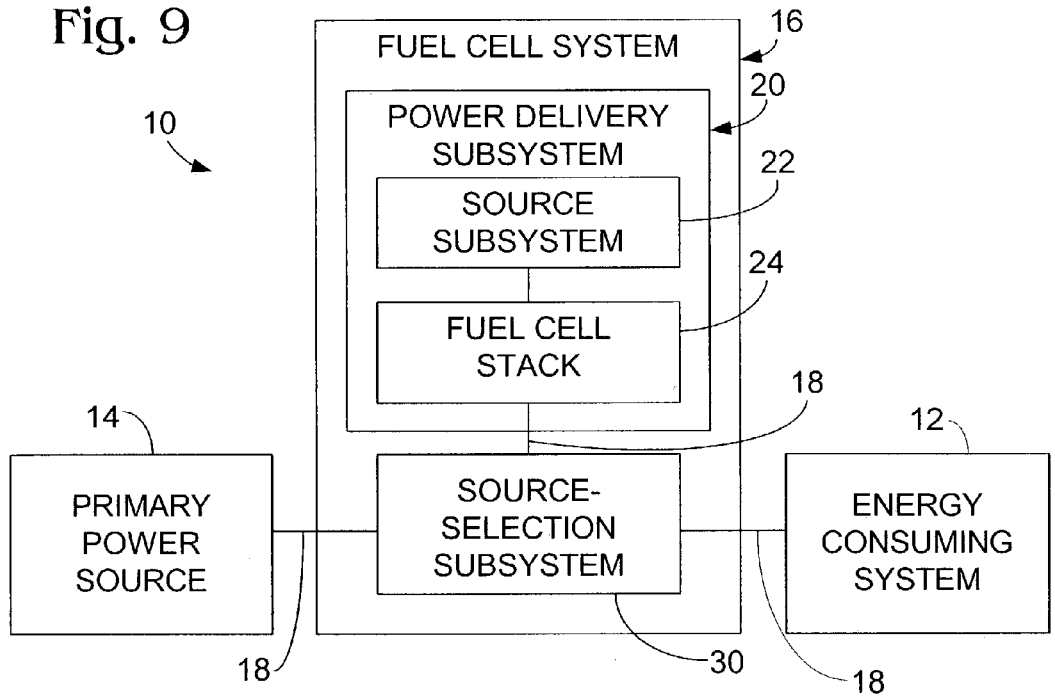
FIG. 9 is a schematic diagram of a power delivery network with an auxiliary fuel cell system that is adapted to provide uninterrupted backup power.

As an illustrative example, it may be acceptable to provide interrupted backup power to many households. A consideration when determining whether interrupted backup power is acceptable is that it may be less expensive to produce an auxiliary fuel cell system that provides only interrupted backup power, such as if the system does not include an energy storage subsystem that is adapted to satisfy the applied load from the energy consuming system. Similarly, when it is acceptable to have an interruption in backup power, the source selection subsystem may be (but is not required to be) slower acting (and less expensive) than in an auxiliary fuel cell system configured to provide uninterrupted backup power. Such an auxiliary fuel cell system is schematically illustrated in FIG. 9.

Figure 10:
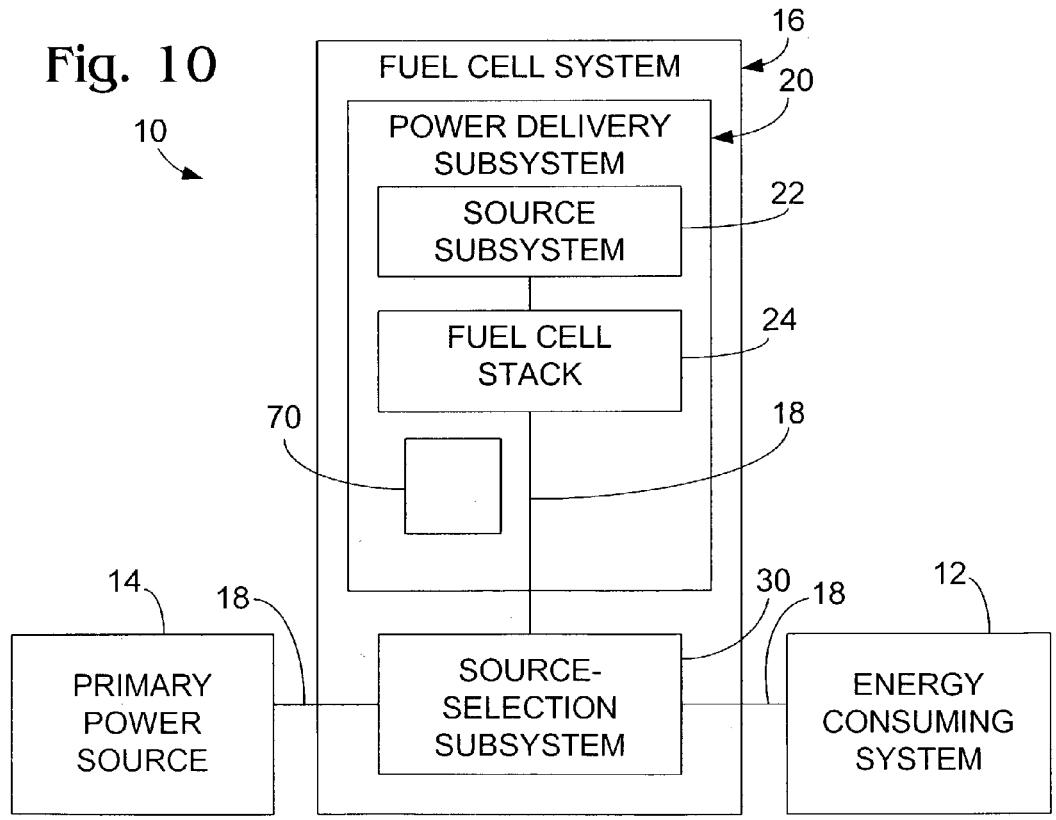
FIG. 10 is a schematic diagram of a power delivery network with another auxiliary fuel cell system that is adapted to provide uninterrupted backup power.

Although such a system may not include an energy storage subsystem that is adapted to satisfy the applied load of the energy consuming system, the auxiliary fuel cell system preferably still includes a startup power supply that is adapted to provide the power required to transition the fuel cell system to a current-producing operating state. Such an auxiliary fuel cell system is schematically illustrated in FIG. 10, with the startup power supply indicated at 70. It is within the scope of the disclosure that supply 70 may have any suitable structure, including the previously discussed structures for energy storage subsystem 26. A difference from energy storage subsystem 26, however, is that supply 70 is not configured and/or not sized to satisfy the applied load from the energy consuming system until the fuel cell system transitions to a current-producing operating state. Upon transitioning of the auxiliary fuel cell system to a current-producing operating state, the produced current may be used to satisfy the applied load of the energy consuming system. Similarly, it is within the scope of the disclosure that this current may be (but is not required to be) used to recharge the startup power supply.

Power delivery subsystem 20 may be configured to initiate energy production by fuel cell stack 24 in response to different triggering events. In some embodiments, the fuel cell stack is configured to begin energy production when the charge (stored energy level) of an energy storage subsystem, such as system 26, falls below a predetermined minimum threshold, such as 90%, 80%, 75%, 50%, 40%, 25% or another selected state of charge less than the subsystem's fully charged state. Triggering responsive to the charge of the energy storage subsystem allows the energy storage subsystem to handle most small interruptions, without needing to start up the fuel cell stack and/or other components of the power delivery subsystem. In some embodiments, the power delivery subsystem may be configured to initiate energy production responsive to a received signal, such as a signal received from power monitor 40 in response to detecting an interrupted operating state of the primary power source. In some embodiments, the fuel cell stack begins energy production in response to a load being applied to the auxiliary fuel cell system. Energy production may be programmed to begin when primary power delivery is interrupted for longer than a predetermined minimum time, thus limiting unnecessarily starting up the fuel cell stack when primary power is interrupted for durations that are shorter than the predetermined minimum time. It should be understood that this time period may be selected according to a variety of factors as user preferences, system tolerances, the acceptable period of time for energy-consuming system 12 to be without power, etc. More than one criteria may be used to determine when energy production begins. For example, a combination of primary power interruption time and energy storage charge level may be used. The above are provided as nonlimiting examples; the auxiliary fuel cell system may be triggered via different events and/or mechanisms.

As described above, upon detecting an interrupted operating state of the primary power source, the source-selection subsystem may enable the supply of power to an energy-consuming system from the power delivery subsystem. When present, the energy storage subsystem may quickly respond to the interruption and supply auxiliary power before the energy-consuming system is adversely affected. Because the fuel cell stack is configured to continually produce electric energy from fuel and oxidant, the auxiliary fuel cell system may provide sustainable electric power while fuel and oxidant are available. The auxiliary fuel cell system may continue to deliver power until primary power delivery is restored or another backup power system is implemented. Furthermore, the auxiliary fuel cell system may continually monitor the primary power source for interruptions in service, and may supply power each time an interruption occurs. Therefore, an auxiliary fuel cell system enhances a primary power source, providing su stainable power delivery, even when the primary power source fails or is otherwise interrupted.

It is also within the scope of the present disclosure that the auxiliary fuel cell system may be configured to start up even if primary power is not interrupted. In this manner, the system may test the operation of one or more of its constituent elements, charge the energy storage subsystem, if present, etc. When the auxiliary fuel cell system is adapted to start up during times in which the primary power source is not in an interrupted operating state, illustrative causal events for this startup include a command signal (such as may be received from the subsequently described communication subsystem), a predetermined period of inactivity, and/or on a periodic cycle (such as daily, weekly, monthly, etc.).

Figure 11:
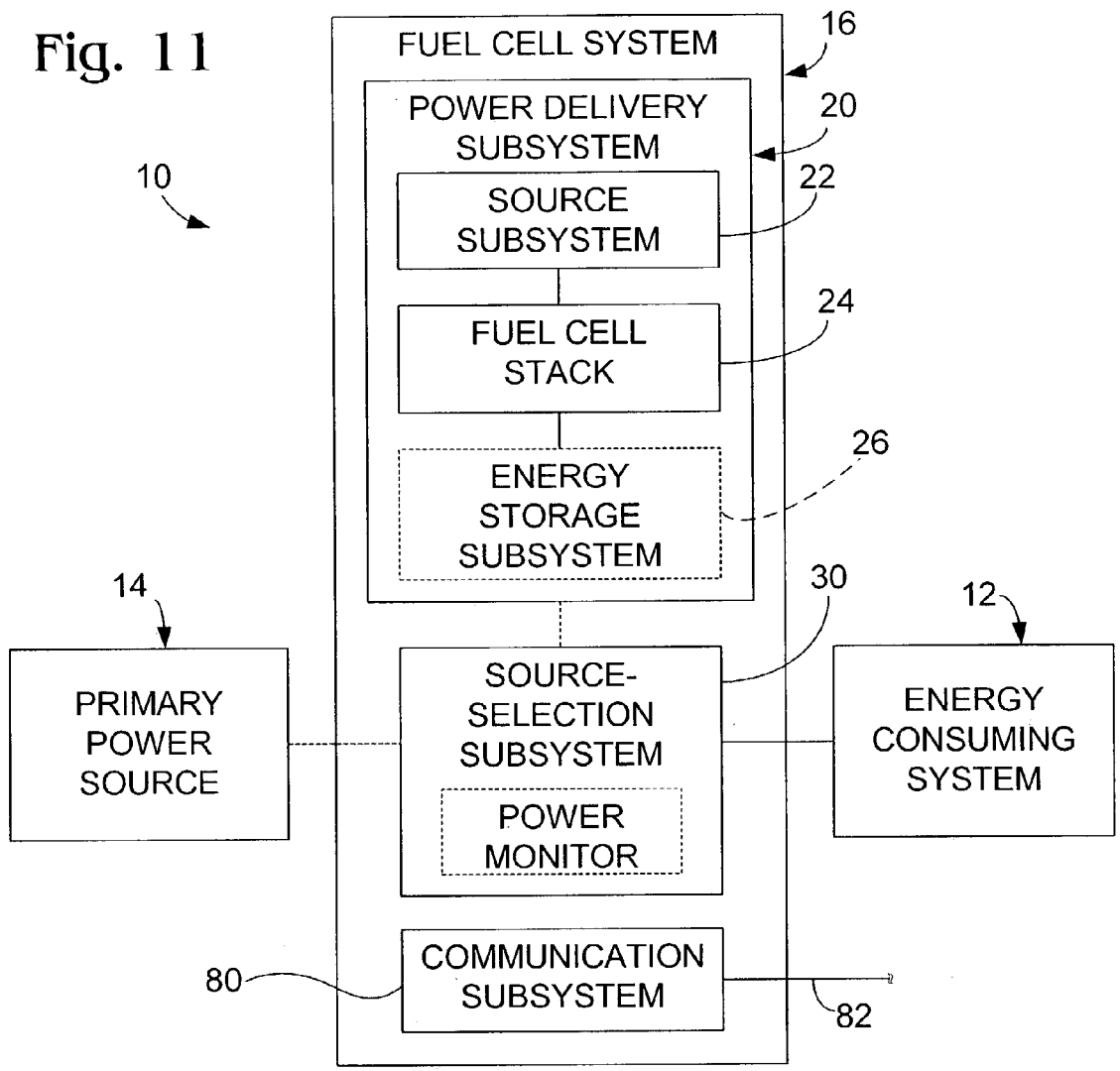
FIG. 11 is a schematic diagram of an auxiliary fuel cell system according to the present disclosure that includes a communication subsystem.

As shown in FIG. 11, auxiliary fuel cell systems 16 according to the present disclosure may (but are not required to) include a communication subsystem 80 that is configured to send and/or receive signals, such as may include data, commands, queries, code, and the like. The communication subsystem may communicate with a control facility via any suitable type and number of communication linkages, such as schematically illustrated in FIG. 11 at 82. For example, communication linkage(s) 82 may be a wired linkage or a wireless linkage and may utilize any suitable communication structure through which communication signals may travel to and/or from the communication subsystem.

As an illustrative example of an application for a communication subsystem that is adapted to send signals, the auxiliary fuel cell system may be configured to send a notification signal, at least partially via communication subsystem 80, responsive to the detection that the primary power source is in an interrupted operating state. This notification signal may be sent, for example, to at least one of a designated communication center, to the entity responsible for maintaining the primary power source, to the entity associated with the energy-consuming system, etc. As another example, a signal may be sent containing data relating to the operation of the auxiliary fuel cell system, or a component thereof. For example, this signal may include data corresponding to such factors as self-tests of the auxiliary fuel cell system, periods of idle and/or operating states, operational data during periods in which the auxiliary fuel cell system is in a current-producing operating state, diagnostic information for predicting need for services and maintenance, advance notice that consumables (e.g., fuel, absorbents, filters, etc.) need replacing, etc.

As an illustrative example of an application for a communication subsystem that is adapted to receive signals, the auxiliary fuel cell system may be configured to receive and respond to a signal, at least partially via communication subsystem 80, that directs the auxiliary fuel cell system to transition to a different operating state. For example, prior to the primary power source being intentionally taken off-line (such as for maintenance or for apportioning power to priority loads) or otherwise transitioned to an interrupted operating state, a signal may be sent to the auxiliary fuel cell system to startup the system or otherwise prepare the system to provide power to the energy-consuming system. As another example, prior to or concurrent with the primary power source being transitioned back on-line or otherwise to a power delivery operating state, a signal may be sent to the auxiliary fuel cell system detecting the auxiliary fuel cell system to transition to an operating state, such as an idle or shut-down operating state, in which the auxiliary fuel cell system is not adapted to provide power to the energy-consuming system. These, and other types of communication signals may be used to improve cooperation between the primary power source and the auxiliary fuel cell system.

The auxiliary fuel cell system may be adapted to stop providing power to satisfy the applied load from the energy consuming system upon detection that the primary power source has returned to its power producing operating state. For example, this interruption in the power provided to the energy-consuming system may be actuated by the source-selection subsystem. The source selection subsystem may detect a power delivery operating state with power monitor 40, or a similar device. The source-selection subsystem may implement a break-then-make connection, operatively disconnecting the power delivery subsystem of the auxiliary fuel cell system before restoring an operative connection of the primary power source to the energy-consuming system. Alternatively, in some embodiments, the primary power source and the power delivery subsystem of the auxiliary fuel cell may be simultaneously connected to the energy-consuming system, or virtually any other suitable switching mechanism or protocol may be used.

Auxiliary fuel cell system 16 may be configured to respond to a return of the primary power source to a power producing operating state in at least one of several different ways. In some embodiments the auxiliary fuel cell system may immediately begin to shut down. In some embodiments, the auxiliary fuel cell system may continue to produce energy that is used to charge the energy storage subsystem until the energy storage subsystem is charged to a predetermined level (typically 100%, but other levels such as 95%, 90%, 80%, etc. may be used and are within the scope of the disclosure), before shutting down or entering an idle operating state in which the fuel cell stack remains ready to output electric energy. In some embodiments, the auxiliary fuel cell system may transition to an idle operating state. In some embodiments, the auxiliary fuel cell system may transition to an idle operating state for a predetermined period of time, such as to see if the primary power source is remaining in a power producing operating state and thereby avoid repeated warm-up and cool-down cycles if primary power is intermittently interrupted. The auxiliary fuel cell system may be configured to use one or more of the above example criteria, as well as other criteria, to control power delivery subsystem behavior when primary power is restored. As is discussed above, commands may also be sent to the communication subsystem directing the auxiliary fuel cell system to transition (such as previously described) back to the operating state in which the primary power source is satisfying the applied load from the energy-consuming system.

Figure 12:
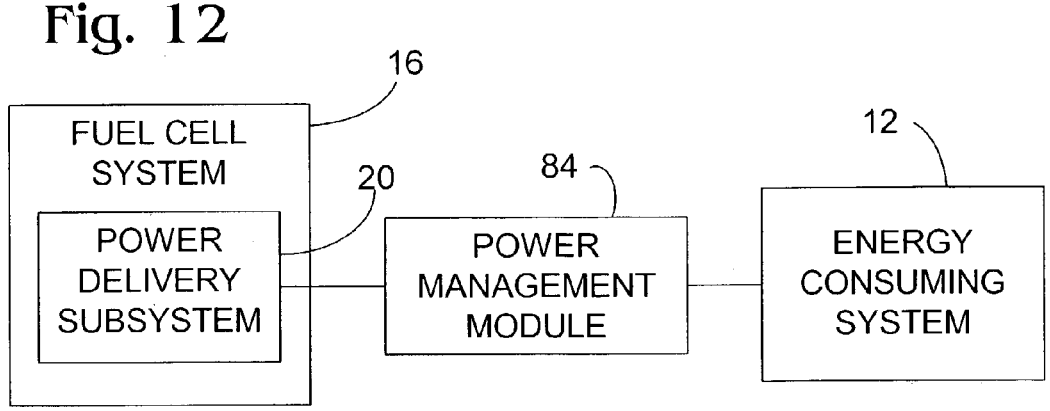
FIG. 12 is a schematic diagram of an auxiliary fuel cell system according to the present disclosure that includes a power management module.

In FIG. 12, a portion of an illustrative auxiliary fuel cell system 16 is shown that includes a power management module 84 through which current from power delivery subsystem 20 is conveyed to energy-consuming system 12. When energy-consuming system 12 requires AC power, module 84 will include an inverter for converting the DC power from the power delivery subsystem to AC power. Module 84 may additionally, or alternatively, include at least one DC-DC converter, such as at least one boost DC-DC converter that increases the voltage of delivered power or at least one buck DC-DC converter that decreases the voltage of delivered power, or electrical output, from the auxiliary fuel cell system. The DC-DC converter receives the unregulated DC stream from power delivery subsystem 20, the voltage of which may be variable with the applied load, and regulates the voltage of the stream to a selected value. The selected value may be more or less than the unregulated voltage. Module 84 may include a DC-DC converter for each fuel cell stack 24 and/or energy storage subsystem, or alternatively, each fuel cell stack and/or energy storage subsystem may be electrically connected to, or include, a dedicated DC-DC converter. The DC-DC converters may be integrated with the fuel cell stack and/or energy storage subsystem, integrated with the power delivery subsystem, or they may be discrete units downstream from the power delivery subsystem. The regulated DC output from the dedicated DC-DC converters may be connected in parallel, series, or via virtually any suitable connection mechanism. It is within the scope of the present disclosure that module 84 may include components other than those discussed herein, and that not all of the above components are required in every embodiment of a power management module. It is also within the scope of the disclosure that auxiliary fuel cell systems may be formed without power management module 84.

As discussed, fuel cell stack 24 typically includes a plurality of fuel cells. The fuel cells are physically arranged between opposing end plates. Each cell is individually configured to convert a fuel and an oxidant into an electric current. The fuel cells are usually electrically coupled in series, although they may be coupled in parallel or in a combination of series and parallel. When electrically coupled, the cells collectively provide an electric potential dependent on the configuration of the stack. For example, if all cells are electrically coupled in series, the electric potential provided by the stack is the sum of the cells respective potentials. Stack 24 may include positive and negative contacts across which a load may be electrically coupled. It should be understood that the number of fuel cells in any particular stack may be selected depending upon the desired power output of the fuel cell stack. Furthermore, though generally described with reference to one fuel cell stack 24, auxiliary fuel cell systems described herein may include two or more fuel cell stacks.

Figure 13:
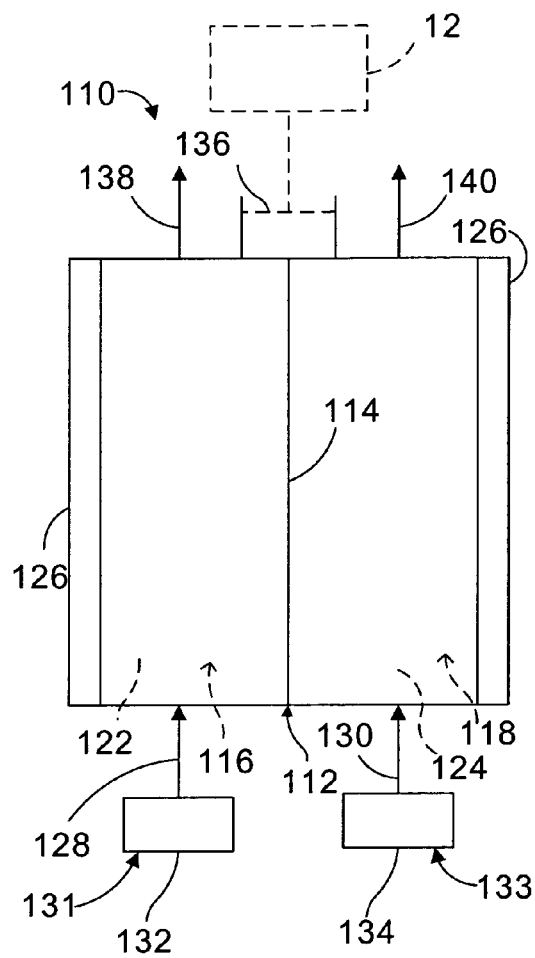
FIG. 13 is a schematic diagram of a proton exchange membrane fuel cell.

Auxiliary fuel cell system 16 may include any suitable type of fuel cells, such as proton exchange membrane (PEM) fuel cells, alkaline fuel cells, solid oxide fuel cells, phosphoric acid fuel cells, molten carbonate fuel cells, and the like. For the purpose of illustration, an exemplary fuel cell in the form of a PEM fuel cell is schematically illustrated in FIG. 13 and generally indicated at 110. Proton exchange membrane fuel cells typically utilize a membrane-electrode assembly (MEA) 112 that includes an ion exchange, or electrolytic, membrane 114 located between an anode region 1116 and a cathode region 118. Each region 116 and 118 includes an electrode, namely an anode 122 and a cathode 124, respectively. Each region 116 and 118 also includes a supporting plate 126, which is typically configured to act as a charge path between adjacent MEAs and physically support adjacent MEAs. In fuel cell stack 24, the supporting plates 126 of adjacent fuel cells may be united to form a bipolar plate separating the adjacent MEAs.

In operation, hydrogen 128 is fed to the anode region, while oxygen 130 is fed to the cathode region. Hydrogen 128 and oxygen 130 may be delivered to the respective regions of the fuel cell from a suitable fuel source 131 and oxidant source 133 via any suitable mechanisms. Fuel source 131 and oxidant source 133 are constituent elements of source subsystem 22, as discussed previously with respect to FIG. 2. In FIG. 13, fuel source 131 includes a source 132 of hydrogen gas, and oxidant source 133 includes a source 134 of oxygen. Examples of suitable sources 132 for hydrogen 128 include a pressurized tank, hydride bed or other suitable hydrogen storage device, and/or a fuel processor that produces a stream containing hydrogen gas. Examples of suitable sources 134 of oxygen 130 include a pressurized tank of oxygen, air, or oxygen-enriched air, or a fan, compressor, blower, or other device for directing air to the cathode region, and/or a device adapted to produce a stream of oxygen-enriched air.

Hydrogen and oxygen typically combine with one another via an oxidation-reduction reaction. Although membrane 114 restricts the passage of a hydrogen molecule, it will permit a hydrogen ion (proton) to pass therethrough, largely due to the ionic conductivity of the membrane. The free energy of the oxidation-reduction reaction drives the proton from the hydrogen gas through the ion exchange membrane. As membrane 114 also tends not to be electrically conductive, an external circuit 136 is the lowest energy path for the remaining electron, and is schematically illustrated in FIG. 13. In cathode region 118, electrons from the external circuit and protons from the membrane combine with oxygen to produce water and heat. Also shown in FIG. 13 are an anode purge stream 138, which may contain hydrogen gas, and a cathode air exhaust stream 140, which is typically at least partially, if not substantially, depleted of oxygen. It should be understood that fuel cell stack 24 will typically have a common hydrogen (or other reactant) feed, air intake, and stack purge and exhaust streams, and accordingly will include suitable fluid conduits to deliver the associated streams to, and collect the streams from, the individual cells.

In practice, a fuel cell stack 24 typically contains a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. At least one energy-consuming system 12 may be electrically coupled to the fuel cell stack. Energy-consuming system 12 applies a load to the stack and draws an electric current therefrom to satisfy the load.

Figure 14:
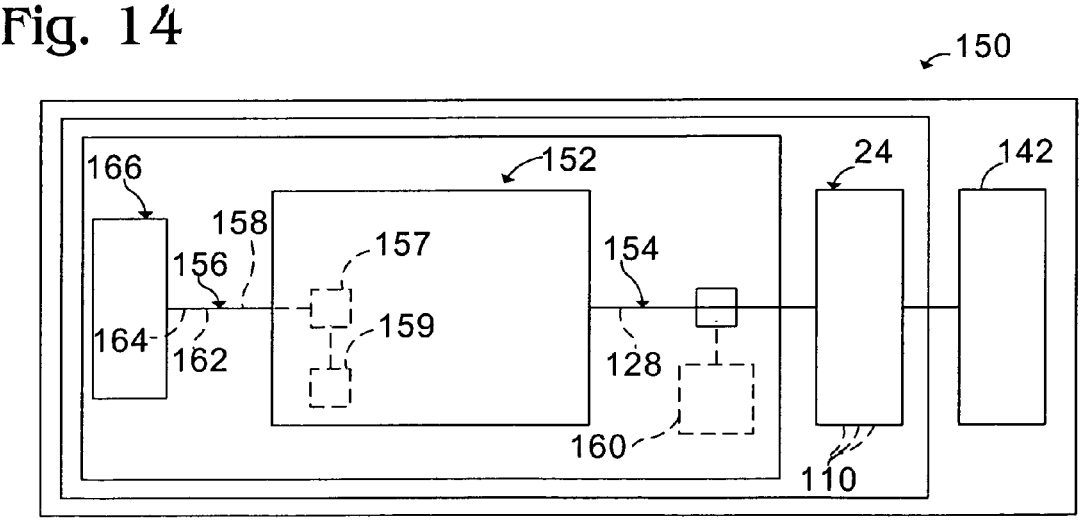
FIG. 14 is a schematic diagram of an auxiliary fuel cell system that includes a fuel processor adapted to produce a stream of hydrogen gas for use as a fuel for the fuel cell stack of the auxiliary fuel cell system.

As discussed above, auxiliary fuel cell system 16 includes a source subsystem 22, which in turn includes a fuel source, such as a source 132 of hydrogen gas 128. As also discussed, an example of a suitable source 132 is a fuel processor that is adapted to produce a product stream of at least substantially pure hydrogen gas 128. An illustrative example of such an auxiliary fuel cell system 16 is shown in FIG. 14 and generally indicated at 150. Auxiliary fuel cell system 150 is illustrated without a source-selection subsystem and other elements discussed above to simplify the discussion of the following elements. System 150 includes at least one fuel processor 152 and at least one fuel cell stack 24. Fuel processor 152 is adapted to produce a product hydrogen stream 154 containing hydrogen gas 128 from a feed stream 156 containing at least one feedstock 158. The fuel cell stack is adapted to produce an electric current from the portion of product hydrogen stream 154 delivered thereto. In the illustrated embodiment, a single fuel processor 152 and a single fuel cell stack 24 are shown; however, it is within the scope of the disclosure that more than one of either or both of these components may be used. It should be understood that these components have been schematically illustrated and that the fuel cell system may include additional components that are not specifically illustrated in the Figures, such as air delivery systems, heat exchangers, heating assemblies and the like. For example, some fuel processors are adapted to produce product hydrogen stream 154 from a vaporized (or gaseous) feed stream 156. In such an embodiment, the feed stream may be delivered to the fuel processor in a vaporized (or gaseous) state, or alternatively the fuel processor may include a vaporization region 157 in which the feed stream is vaporized, such as by a suitable burner or other heating assembly 159, as indicated in dashed lines in FIG. 14.

In the illustrative embodiment shown in FIG. 14, hydrogen gas may be delivered to stack 24 from one or more of fuel processor 152 and a hydrogen storage device 160, which may include any suitable structure for storing hydrogen gas. Examples of suitable structures include hydride beds and pressurized tanks. As also shown in the illustrative embodiment shown in FIG. 14, hydrogen 128 from the fuel processor may be delivered to one or more of the storage device and stack 24. Some or all of stream 154 may additionally, or alternatively, be delivered, via a suitable conduit, for use in another hydrogen-consuming process, burned for fuel or heat, or stored for later use.

Fuel processor 152 is any suitable device that produces from the feed stream a stream (such a product hydrogen stream 154) that contains at least substantially hydrogen gas. Examples of suitable mechanisms for producing hydrogen gas from feed stream 156 include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Figure 15:
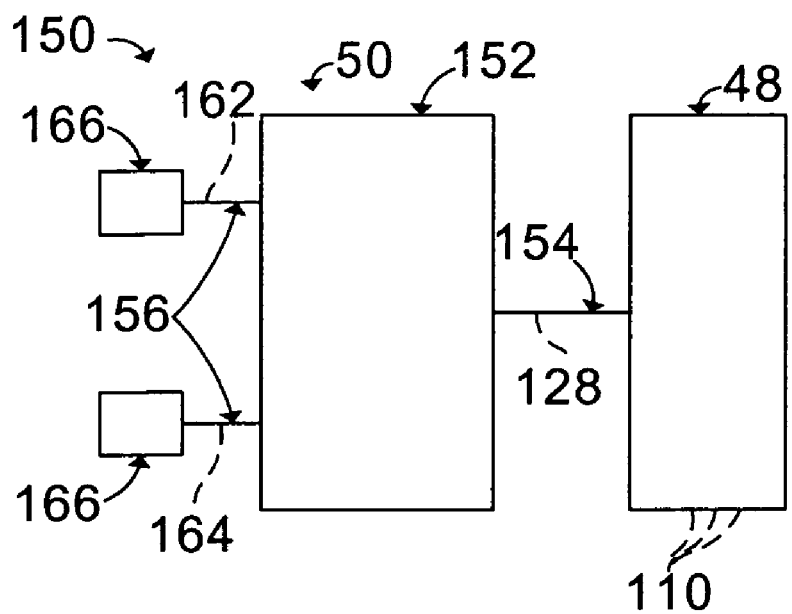
FIG. 15 is a schematic diagram of another fuel cell system with a fuel processor.

Feed stream 156 may be delivered to fuel processor 152 via any suitable mechanism. Although only a single feed stream 156 is shown in FIG. 14, it should be understood that more than one stream 156 may be used and that these streams may contain the same or different feedstocks. For example, when fuel processor 152 is adapted to receive a feedstock 158 that includes a carbon-containing feedstock 162 and water 164, the carbon-containing feedstock and water may be delivered in separate feed streams or in the same feed stream. For example, when the carbon-containing feedstock is miscible with water, the feedstock is typically, but not required to be, delivered with the water component of feed stream 156, such as shown in FIG. 14. When the carbon-containing feedstock is immiscible or only slightly miscible with water, these feedstocks are typically delivered to fuel processor 152 in separate streams, such as shown in FIG. 15. In FIGS. 14 and 15, feed stream 156 is shown being delivered to fuel processor 152 by a feedstock delivery system 166, which may be any suitable pump, compressor, and/or flow-regulating device that selectively delivers the feed stream to the fuel processor.

It is desirable for the fuel processor to produce at least substantially pure hydrogen gas. Accordingly, the fuel processor may utilize a process that inherently produces sufficiently pure hydrogen gas, or the fuel processor may include suitable purification and/or separation devices that remove impurities from the hydrogen gas produced in the fuel processor. As another example, the fuel processing system or fuel cell system may include purification and/or separation devices downstream from the fuel processor. In the context of a fuel cell system, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 6,221,117, 5,997,594, 5,861,137, and pending U.S. patent application Ser. No. 09/802,361. The complete disclosures of the above-identified patents and patent application are hereby incorporated by reference for all purposes.

Figure 16:
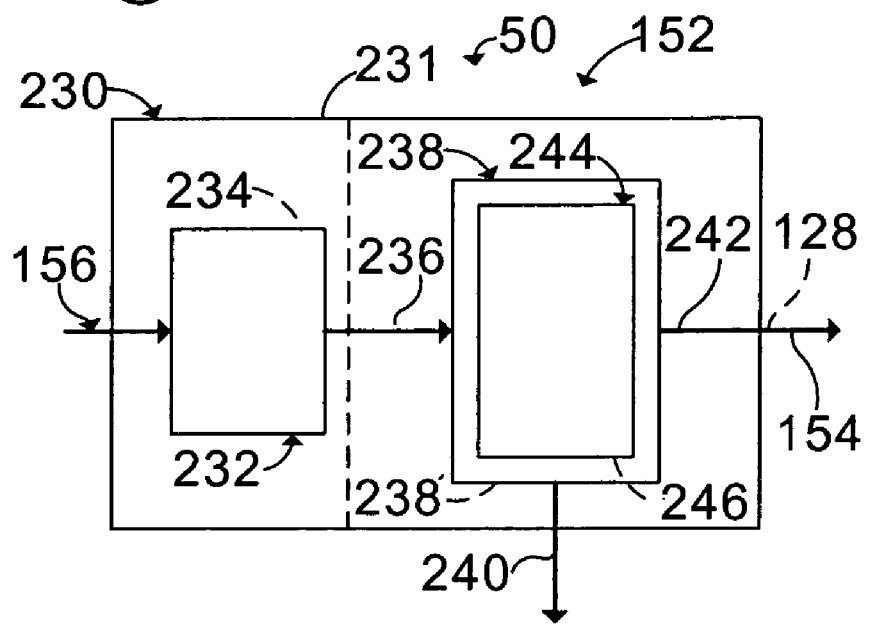
FIG. 16 is a schematic diagram of an illustrative fuel processor.

For purposes of illustration, the following discussion will describe fuel processor 152 as a steam reformer adapted to receive a feed stream 156 containing a carbon-containing feedstock 162 and water 164. However, it is within the scope of the disclosure that fuel processor 152 may take other forms, as discussed above. An example of a suitable steam reformer is shown in FIG. 16 and indicated generally at 230. Reformer 230 includes a reforming, or hydrogen-producing, region 232 that includes a steam reforming catalyst 234. Alternatively, reformer 230 may be an autothermal reformer that includes an autothermal reforming catalyst. In reforming region 232, a reformate stream 236 is produced from the water and carbon-containing feedstock in feed stream 156. The reformate stream typically contains hydrogen gas and other gases. In the context of a fuel processor generally, a mixed gas stream that contains hydrogen gas and other gases is produced from the feed stream. The mixed gas, or reformate, stream is delivered to a separation region, or purification region, 238, where the hydrogen gas is purified. In separation region 238, the hydrogen-containing stream is separated into one or more byproduct streams, which are collectively illustrated at 240 and which typically include at least a substantial portion of the other gases, and a hydrogen-rich stream 242, which contains at least substantially pure hydrogen gas. The separation region may utilize any separation process, including a pressure-driven separation process. In FIG. 16, hydrogen-rich stream 242 is shown forming product hydrogen stream 154.

An example of a suitable structure for use in separation region 238 is a membrane module 244, which contains one or more hydrogen permeable membranes 246. Examples of suitable membrane modules formed from a plurality of hydrogen-selective metal membranes are disclosed in U.S. Pat. No. 6,319,306, the complete disclosure of which is hereby incorporated by reference for all purposes. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in the above-incorporated patents and applications, as well as U.S. Pat. Nos. 6,562,111 and 6,537,352, the complete disclosures of which are hereby incorporated by reference in their entirety for all purposes. Membrane(s) 246 may also be integrated directly into the hydrogen-producing region or other portion of fuel processor 152.

The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents. Another example of a suitable pressure-separation process for use in separation region 238 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 236.

It is within the scope of the present disclosure that separation region 238 may additionally or alternatively utilize a chemical process for increasing the purity of the hydrogen gas and/or selectively reducing the concentration of one or more components (such as carbon monoxide and/or carbon dioxide) that are mixed in with the hydrogen gas. For at least many conventional PEM fuel cells, the concentration of carbon monoxide should be less than 10 ppm (parts per million). Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein. Similarly, when fuel processor 152 is used with a fuel cell stack that is more tolerant of these impurities, then the product hydrogen stream may contain larger amounts of these gases.

An example of a chemical separation process includes a methanation catalyst bed that selectively reduces the concentration of any carbon monoxide in the stream or streams through the production of methane. Another example is a water-gas shift reaction.

As discussed, it is also within the scope of the disclosure that at least some of the purification of the hydrogen gas is performed intermediate the fuel processor and the fuel cell stack. Such a construction is schematically illustrated in dashed lines in FIG. 16, in which the separation region 238' is depicted downstream from the shell 231 of the fuel processor.

Steam reformers typically operate at temperatures in the range of 200° C. and 800° C., and at pressures in the range of 50 psi and 1000 psi, although temperatures and pressures outside of these ranges are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source, or any combination thereof.

To simplify description of the illustrative fuel cell systems and fuel processors shown in FIGS. 14-16, source-selection subsystem 30, as well as other elements, have not been shown. Typically, these subsystems and/or other elements will be either commonly housed with at least one of the above-described components of the fuel cell system or fuel processor, or located directly proximate thereto. It should be understood that measurement subsystems (not shown) may include various sensors, or assemblies of sensors placed in suitable positions for detecting the corresponding operating parameter to be measured. Similarly, controllers may include suitable control linkages or actuators configured to respond to a control signal to initiate a desired response from the fuel cell system. Illustrative, non-exclusive examples of sensor positions and control linkages/actuators are disclosed in U.S. Pat. Nos. 6,451,464, 6,383,670, 6,375,906, and 6,242,120, and in U.S. patent application Ser. Nos. 09/626,311 and 09/815,180, the complete disclosures of which are hereby incorporated by reference.

It is within the scope of the disclosure that the various subsystems, units, devices, etc. discussed herein may, in some embodiments, share components such as processors, busses, power supplies, communication linkages, etc. with each other. In this manner, a single component may be utilized by more than one subsystem. Similarly, components described herein as subsystems may also be separate implements so long as any required interactions with other components described herein are maintained.

INDUSTRIAL APPLICABILITY

The invented power delivery network, auxiliary fuel cell system, and methods for providing a reliable power source for an energy-consuming system are applicable to the fuel processing, fuel cell and other industries in which there is a need for reliable power supplies.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. An auxiliary fuel cell system configured to backup a primary power source adapted to supply power to an energy-consuming system, the primary power source being in electrical communication with the energy-consuming system via at least a first power linkage, the first power linkage being configured to be enabled and disabled regardless of whether the primary power source is producing electric current, the auxiliary fuel cell system comprising:
   a fuel source;
   an oxidant source;
   a fuel cell stack configured to conditionally produce an electric current from fuel received from the fuel source and oxidant received from the oxidant source according to the operating state of the primary power source, wherein the fuel cell stack produces electric current when the primary power source is in an interrupted operating state, and the fuel cell stack does not produce electric current when the primary power source is in a power delivery operating state, wherein the primary power source includes at least one of a utility grid, a wind-powered energy source, a solar-powered energy source, a water-powered energy source, and a nuclear-powered energy source, wherein the auxiliary fuel cell system is in electrical communication with the energy-consuming system via at least a second power linkage, the second power linkage being configured to be enabled and disabled regardless of whether the auxiliary fuel cell system is producing electric current; and
   a source-selection subsystem that selectively enables and disables at least the first and second power linkages to selectively regulate, based at least in part upon determination of the operating state of the primary power source, which of the auxiliary fuel cell system and the primary power source is currently configured to provide power to satisfy an applied load from the energy-consuming system, wherein the source-selection subsystem is configured to implement a break-then-make connection to prevent backfeed between the primary power source and the auxiliary fuel cell system.

2. The system of claim 1, wherein the auxiliary fuel cell system further comprises a communication subsystem adapted to selectively send or receive signals.

3. The system of claim 2, wherein the communication subsystem is adapted to transmit notification signals responsive to at least one of detecting that the primary power source is in an interrupted operating state and the enabling of a power linkage between the energy-consuming system and the auxiliary fuel cell system.

4. The system of claim 2, wherein the communication subsystem is adapted to enable a power linkage between the energy-consuming system and the auxiliary fuel cell system responsive to receiving a signal indicative of the primary power source transitioning to an interrupted operating state.

5. The system of claim 2, wherein the communication subsystem is adapted to disable a power linkage between the energy-consuming system and the auxiliary fuel cell system responsive to receiving a signal indicative of the primary power source returning to a power delivery operating state.

6. The system of claim 1, wherein the source-selection subsystem further comprises a power monitor adapted to detect an operating state of a primary power source, wherein responsive to the detection that the primary power source is in an interrupted operating state in which the primary power source is not currently configured to provide power to satisfy the applied load from the energy-consuming system, the auxiliary fuel cell system is adapted to provide power to the energy-consuming system from the fuel cell stack.

7. The system of claim 6, wherein upon detection that the primary power source has returned to a power producing operating state in which the primary power source is currently configured to provide power to the energy-consuming system, the source-selection subsystem is adapted to selectively disable the power linkage between the auxiliary fuel cell system and the energy-consuming system.

8. The system of claim 7, wherein upon disabling of the power linkage with the energy-consuming system, the auxiliary fuel cell system is adapted to automatically shut down.

9. The system of claim 7, further comprising an energy storage subsystem adapted to receive at least a portion of the electric current from the fuel cell stack.

10. The system of claim 9, wherein upon disabling of the power linkage with the energy-consuming system, the auxiliary fuel cell system is adapted to recharge the energy storage subsystem.

11. The system of claim 7, wherein upon disabling of the power linkage with the energy-consuming system, the auxiliary fuel cell system is adapted to transition to an idle operating state.

12. The system of claim 1, wherein the source-selection subsystem includes feedback prevention structure adapted to prevent power from at least one of the primary power source and the fuel cell stack of the auxiliary fuel cell system from being applied to the other of the primary power source and the fuel cell stack of the auxiliary fuel cell system.

13. The system of claim 1, wherein the source-selection subsystem is adapted to selectively disable the power linkage between the primary power source and the energy-consuming system prior to enabling the power linkage between the auxiliary fuel cell system and the energy-consuming system.

14. The system of claim 1, wherein the fuel comprises hydrogen gas and the fuel source includes a storage device containing hydrogen gas.

15. The system of claim 1, wherein the fuel comprises hydrogen gas and the fuel source comprises a fuel processor adapted to produce hydrogen gas.

16. The system of claim 15, wherein the fuel processor is adapted to produce the fuel by steam reforming water and a carbon-containing feedstock.

17. The system of claim 1, wherein the primary power source includes a utility grid.

18. The system of claim 1, wherein the primary power source includes at least one of a wind-powered energy source, a water-powered energy source, and a water-powered energy source.

* * * * *

UNITED STATES PATENT AND TRADEMARK OFFICE
CERTIFICATE OF CORRECTION

PATENT NO. : 7,250,231 B2 Page 1 of 1
APPLICATION NO. : 10/458140
DATED : July 31, 2007
INVENTOR(S) : David J. Edlund It is certified that error appears in the above-identified patent and that said Letters Patent is hereby corrected as shown below:

Column 24,
Lines 23-24 Claim 18, after "a wind-powered energy source, a" please delete "water" and insert --solar-- therefor.

Signed and Sealed this

Sixth Day of November, 2007

JON W. DUDAS
*Director of the United States Patent and Trademark Office*